United States Patent
Chen et al.

(10) Patent No.: US 9,124,182 B2
(45) Date of Patent: Sep. 1, 2015

(54) DC-DC CONVERTER WITH ACTIVE CLAMP CIRCUIT FOR SOFT SWITCHING

(71) Applicant: Industrial Technology Research Institute, Chutung, Hsinchu (TW)

(72) Inventors: Po-Li Chen, Hsinchu (TW); Pao-Chuan Lin, Hsinchu (TW); Ming-Hung Yu, Hsinchu (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 153 days.

(21) Appl. No.: 13/875,986

(22) Filed: May 2, 2013

(65) Prior Publication Data
US 2014/0085937 A1 Mar. 27, 2014

(30) Foreign Application Priority Data
Sep. 27, 2012 (TW) ............................. 101135480 A

(51) Int. Cl.
*H02M 1/34* (2007.01)
*H02M 3/335* (2006.01)

(52) U.S. Cl.
CPC ............ *H02M 3/33507* (2013.01); *H02M 1/34* (2013.01); *H02M 3/33569* (2013.01); *H02M 2001/342* (2013.01); *Y02B 70/1491* (2013.01)

(58) Field of Classification Search
CPC ... H02M 3/33507; H02M 3/335; H02M 1/32; H02M 1/34; H02M 2001/342; H02M 2001/346
USPC ........... 363/21.01, 21.04, 21.12, 56.11, 56.12
See application file for complete search history.

(56) References Cited

U.S. PATENT DOCUMENTS

| | | | |
|---|---|---|---|
| 7,262,979 B2 | 8/2007 | Wai et al. | |
| 7,573,731 B2 | 8/2009 | Kwon et al. | |
| 7,869,235 B2 * | 1/2011 | Lin et al. | 363/56.11 |
| 7,916,505 B2 * | 3/2011 | Fornage | 363/21.01 |
| 8,009,448 B2 | 8/2011 | Liu | |
| 2001/0019490 A1 * | 9/2001 | Igarashi et al. | 363/19 |
| 2003/0086279 A1 | 5/2003 | Bourdillon | |

FOREIGN PATENT DOCUMENTS

| | | |
|---|---|---|
| TW | M331250 | 4/2008 |
| TW | 201101669 | 1/2011 |

OTHER PUBLICATIONS

Kuo, et al., "An isolated high step-up forward/flyback active-clamp converter with output voltage lift"—, S.M.-Conference Publications; Sep. 2010; pp. 542-548.
Murthy-Bellur, et al., "Active-clamp ZVS two-switch flyback converter" Conference Publications, May 2011, p. 214-244.

(Continued)

*Primary Examiner* — Harry Behm
(74) *Attorney, Agent, or Firm* — Muncy, Geissler, Olds & Lowe, P.C.

(57) ABSTRACT

A DC-DC converter includes a power conversion circuit for converting a DC input voltage to a DC output voltage; and an active clamp circuit for soft switching a first active switching element of the power conversion circuit and recovering leakage inductance energy of a main transformer of the power conversion circuit. As such, the present disclosure provides a DC-DC converter that reduces the switching loss of the switching elements and effectively recovers the leakage inductance energy, thus increasing the conversion efficiency of the converter.

6 Claims, 4 Drawing Sheets

(56) References Cited

OTHER PUBLICATIONS

Mousavi, et al., "Comparative Study of a New ZCS DC-DC Full-Bridge Boost Converter Wih a ZVS Active-Clamp Converter", IEEE Transactions on Power Electronics, Mar. 2012, p. 1347-1358, vol. 27, No. 3.

Ryu, et al., "Interleaved active clamp flyback inverter using a synchronous rectifier for a photovoltaic AC module system", 8th International Conference on Power Electronics, May 30-Jun. 3, 2011, p. 2631-2636.

Ji, et al., "Dual Mode Switching Strategy of Flyback Inverter for Photovoltaic AC Modules", The 2010 International Power Electronics Conference, 2010, p. 2924-2929.

Kim, et al., "A new control strategy of active clamped flyback inverter for a photovoltaic AC module system", 8th International Conference on Power Electronics—ECCE Asia, May 30-Jun. 3, 2011, p. 1880-1885.

\* cited by examiner

DC-DC CONVERTER WITH ACTIVE CLAMP CIRCUIT FOR SOFT SWITCHING

CROSS-REFERENCE TO RELATED APPLICATIONS

This application claims priority to Taiwanese Patent Application No. 101135480, filed on Sep. 27, 2012. The entirety of the above-mentioned patent application is hereby incorporated by reference herein and made a part of this specification.

TECHNICAL FIELD

The present disclosure relates to DC-DC converters, and more particularly, to a DC-DC converter having an active clamp circuit and a method of driving the DC-DC converter.

BACKGROUND

With the growing energy shortages on earth, the development of renewable (green) energy systems such as solar power generation systems is in an urgent need, wherein more efficient use of electrical energy is a key in promoting the progression of solar power generation system.

Isolated DC-DC converters are widely used in solar power generation systems particularly for medium or low power conversion, due to their good performance in voltage regulation and electrical isolation, as well as providing high reliability.

In traditional power converters, power switches are turned on/off through hard switching. Due to the transformer leakage inductance and stray capacitance of the circuit wirings, hard switching tends to have issues such as high conversion loss, noise, switching stress and other issues. With regard to a metal-oxide-semiconductor field-effect transistor (MOSFET), if hard switching is used, when the switching element is turned off, the voltage at either end of drain-source will rise quickly and produce a voltage surge, such that the MOSFET will encounter a voltage exceeding the normal input range. The voltage stress of the switch element is thus increased. When the switching element is turned on, the switching element will generate a current surge that is larger than the normal current at the instant of conduction owing to the influence of the bypass capacitor of the MOSFET itself, thereby increasing the current stress of the power element.

In order to improve the issues brought about by hard switching, clamp circuits are developed to reduce the voltage and current stresses of the power switches. However, some issues still exist in the following three common ways of implementing a traditional clamp circuit: (1) the recovery of energy of a RCD clamp circuit is absorbed by its resistors, thereby reducing the overall efficiency of the circuit; (2) it is difficult to implement an LCD clamp circuit, although it can achieve zero-voltage soft switching and energy recovery since timing of resonance of the inductor and the capacitor has to be taken into account, and furthermore, in circumstances of high frequency and large current, the resonant current will result in very high conduction loss in the circuit; and (3) an active clamp circuit is consisted of an active switching element and a capacitor, its design is relatively simple, and it is capable of achieving zero-voltage switching of the switching element, energy recovery of the leakage inductance, suppressing switching surges and other effects; however, its active switching element and the active switching element in the conversion circuit are turned on alternately in each switching cycle, resulting in higher switching loss and poor energy recovery in the active switching element of the active clamp circuit, and its conversion efficiency cannot be improved effectively for converters.

Therefore, there is an urgent need in the art to provide a DC-DC converter that is capable of soft switching, reducing the switching loss of the active switching element in the active clamp circuit, and further improving the efficiency of energy recovery.

SUMMARY

The present disclosure provides a DC-DC converter, which includes a power conversion circuit for converting a DC input voltage to a DC output voltage, and an active clamp circuit for soft switching a first active switching element of the power conversion circuit and recovering leakage inductance energy of a main transformer of the power conversion circuit, wherein the power conversion circuit include the main transformer with a primary winding and a secondary winding; the first active switching element with a first source terminal and a first drain terminal, and the first drain terminal being electrically connected to the primary winding of the main transformer. The active clamp circuit include a second passive switching element with an anode terminal and a cathode terminal, wherein the anode terminal is electrically connected to the first drain terminal of the first active switching element and the primary winding of the main transformer; an auxiliary transformer with a primary winding and a secondary winding, wherein the primary winding of the auxiliary transformer is electrically connected to the cathode terminal of the second passive switching element; a third passive switching element connected in series with the secondary winding of the auxiliary transformer; a clamp capacitor with one terminal electrically connected to the primary winding of the auxiliary transformer and the cathode terminal of the second passive switching element and another terminal electrically connected to the primary winding of the main transformer; and a second active switching element with a second source terminal and a second drain terminal, wherein the second drain terminal is electrically connected to the primary winding of the main transformer and the second drain terminal is electrically connected to the primary winding of the auxiliary transformer.

The present disclosure further provides a DC-DC converter, which includes a power conversion circuit for converting a DC input voltage to a DC output voltage, and an active clamp circuit for soft switching a first active switching element of the power conversion circuit and recovering leakage inductance energy of a main transformer of the power conversion circuit, wherein the power conversion include the main transformer with a primary winding, a secondary winding and a tertiary winding; the first active switching element with a first source terminal and a first drain terminal, and the first drain terminal being electrically connected to the primary winding of the main transformer. The active clamp circuit include a second passive switching element with an anode terminal and a cathode terminal, wherein the anode terminal is electrically connected to the first drain terminal of the first active switching element and the primary winding of the main transformer; a clamp capacitor with one terminal electrically connected to the tertiary winding of the main transformer and the cathode terminal of the second passive switching element and another terminal electrically connected to the primary winding of the main transformer; and a second active switching element with a second source terminal and a second drain terminal, wherein the second drain terminal is electrically connected to the primary winding of the main transformer and the second drain terminal is electrically connected to the tertiary winding of the main transformer.

The present disclosure further provides a driving method of the above DC-DC converter, which includes during operation of the power conversion circuit, detecting a voltage drop between an intersection of the clamp capacitance with the cathode terminal of the second passive switch element and a ground point, and when the voltage drop is higher than a predetermined threshold, turning on the second active switching element to perform PWM switching of the second active switching element, so as to recover the energy of the clamp capacitor via the auxiliary transformer, and correspondingly transfer the energy of the clamp capacitor to the secondary winding of the auxiliary transformer.

The present disclosure further provides a driving method of the above DC-DC converter, which includes during operation of the power conversion circuit, detecting a voltage drop between an intersection of the clamp capacitance with the cathode terminal of the second passive switch element and a ground point, and when the voltage drop is higher than a predetermined threshold, turning on the second active switching element to perform PWM switching of the second active switching element, so as to recover the energy of the clamp capacitor via the tertiary winding of the main transformer, and correspondingly transfer the energy of the clamp capacitor to the secondary winding of the main transformer.

BRIEF DESCRIPTION OF DRAWINGS

The present disclosure can be more fully understood by reading the following detailed description of the preferred embodiments, with reference made to the accompanying drawings, wherein.

DETAILED DESCRIPTION

Figure 1:
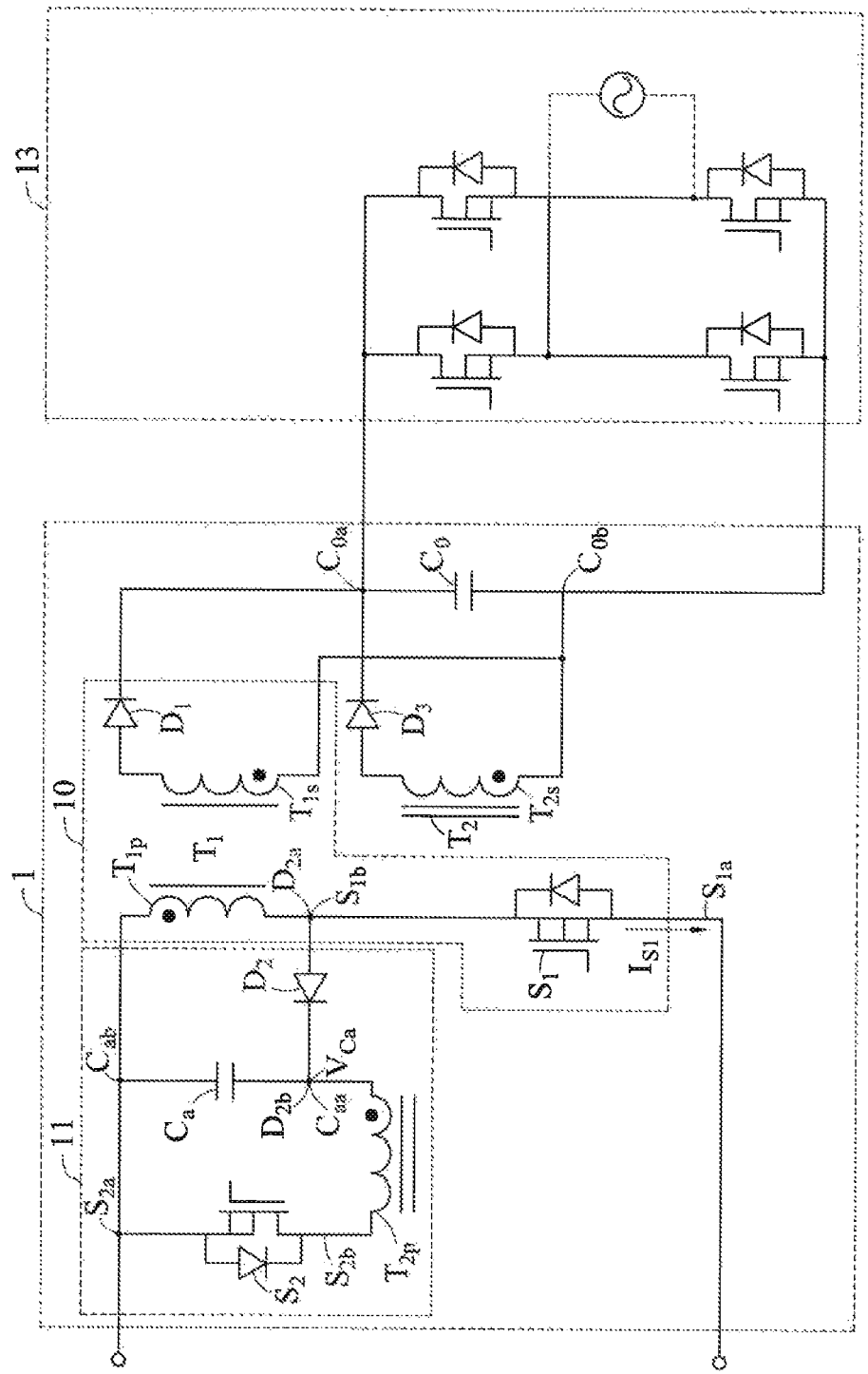
FIG. 1 is a schematic diagram illustrating the structure of a DC-DC converter in accordance with an embodiment of the present disclosure.

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

FIG. 1 is a schematic diagram illustrating the structure of a DC-DC converter in accordance with an embodiment of the present disclosure. As shown, the DC-DC converter 1 of the present disclosure essentially includes a power conversion circuit 10 and an active clamp circuit 11.

The power conversion circuit 10 is used to convert a DC input voltage to a DC output voltage. The power conversion circuit 10 includes a main transformer $T_1$ with a primary winding $T_{1p}$ and a secondary winding $T_{1s}$, a first active switching element $S_1$ having a first source terminal $S_{1a}$ and a first drain terminal $S_{1b}$, and a first passive switching element $D_1$.

The first active switching element $S_1$ is electrically connected to the primary winding $T_{1p}$ of the main transformer $T_1$ via the first drain terminal $S_{1b}$, and the first passive switching element $D_1$ is connected in series with secondary winding $T_{1s}$ of the main transformer $T_1$, but the connection with the secondary winding is not limited thereto.

The active clamp circuit 11 is used for soft switching when the first active switching element $S_1$ is turned on and for recovering the leakage inductance energy of the main transformer $T_1$ of the power conversion circuit 10. The active clamp circuit 11 includes a second passive switching element $D_2$ having an anode terminal $D_{2s}$ and cathode terminal $D_{2b}$, an auxiliary transforming $T_2$ having a primary winding $T_{2p}$ and a secondary winding $T_{2s}$, a third passive switching element $D_3$, a clamp capacitor $C_a$ with two opposite terminals $C_{aa}$ and $C_{ab}$ and a second active switching element $S_2$ with a second source terminal $S_{2a}$ and a second drain terminal $S_{2B}$.

In the active clamp circuit 11, the second passive switch element $D_2$ is electrically connected to the first drain terminal $S_{1b}$ of the first active switching elements $S_1$ and the primary winding $T_{1p}$ of the main transformer $T_1$. The primary winding $T_{2p}$ of the auxiliary transformer $T_2$ is electrically connected to the cathode terminal $D_{2b}$ of the second passive switch element $D_2$ and one terminal $C_{aa}$ of the clamp capacitor $C_a$. The second source terminal $S_{2a}$ of the second active switch element $S_2$ is electrically connected to the primary winding $T_{1p}$ of the main transformer $T_1$ and the other terminal $C_{ab}$ of the clamp capacitor $C_a$. The second drain terminal $S_{2b}$ is electrically connected to the primary winding $T_{2p}$ of the auxiliary transformer $T_2$. The third passive switching element $D_3$ is connected in series with the secondary winding $T_{2s}$ of the auxiliary transformer winding $T_2$.

In one embodiment, the DC-DC converter 1 of the present disclosure further includes a filtering capacitor $C_o$, which has two opposite terminals $C_{oa}$ and $C_{ob}$, wherein one terminal $C_{oa}$ is electrically connected to the first passive switching element $D_1$ and the third passive switching element $D_3$, while the other terminal $C_{ob}$ is electrically connected to the secondary winding $T_{1s}$ of the main transformer $T_1$ and the secondary winding $T_{2s}$ of the auxiliary transformer $T_2$, so as to filter the output signal of the DC-DC converter 1.

In another embodiment, the DC-DC converter 1 further includes a control element (not shown), which is electrically connected to the first active switching element $S_1$, and is electrically connected to the second active switching element $S_2$ through signal isolating element, such as an optical coupling or isolation transformer, in order to control the turning-on or turning-off of the first active switching element $S_1$ and the second active switching element $S_2$, wherein the control element is an analog integrated circuit or a digital integrated circuit.

In another embodiment, the DC-DC converter 1 further includes a low-frequency DC-AC circuit 13, which is electrically connected to the secondary winding $T_{1s}$ of the main transformer $T_1$ in order to convert the output voltage of power conversion circuit 10 into an AC output voltage in synchronization with the mains, so as to incorporate the DC power generated by the solar power generation system into the AC grid of the mains, wherein the low-frequency DC-AC circuit 13 is a bridge circuit consisting of four active switching elements.

In the above embodiment, the first and second active switching elements $S_1$ and $S_2$ are power MOSFETs, and the first to third passive switching elements D, $D_2$ and $D_3$ are diodes.

Figure 2:
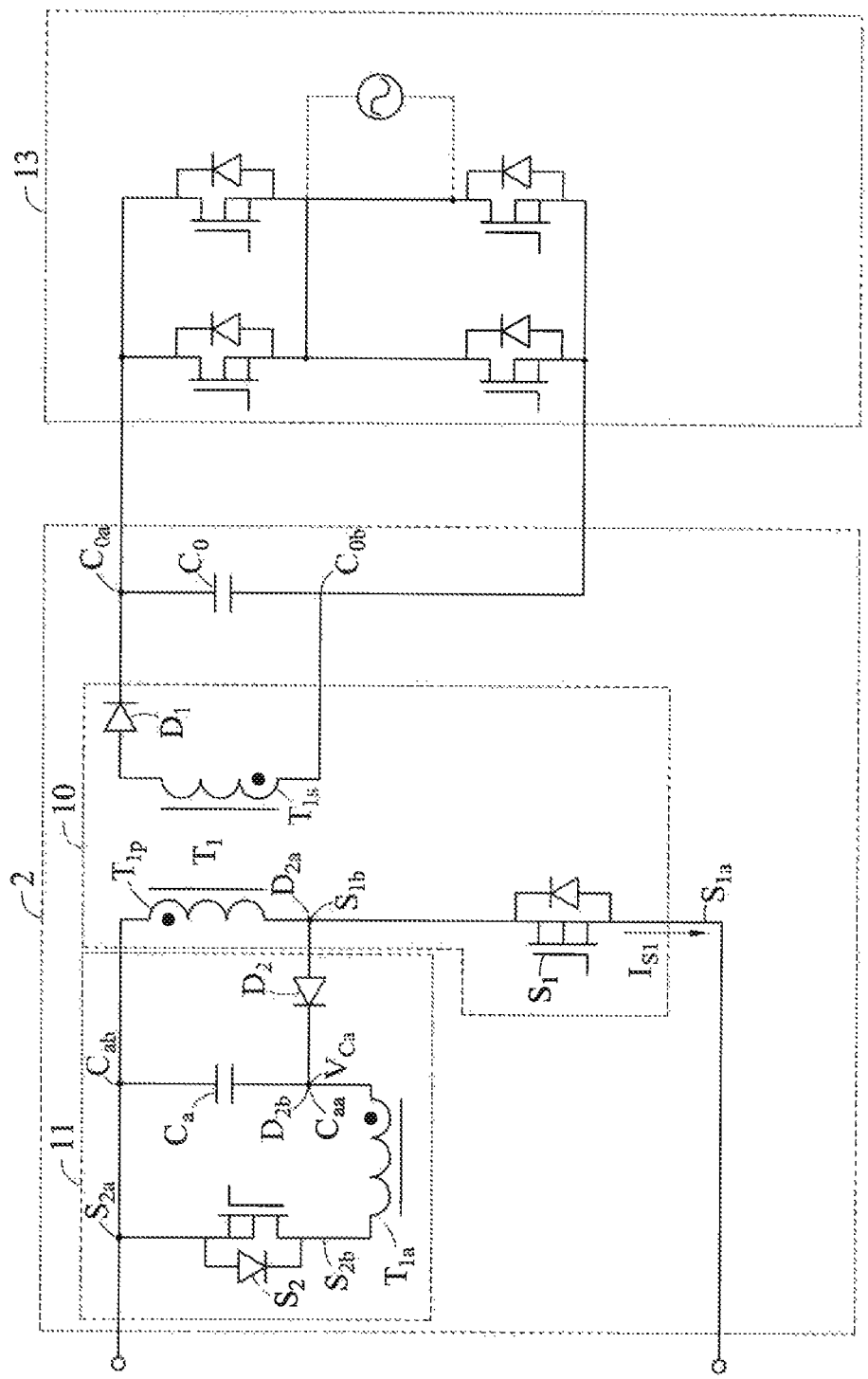
FIG. 2 is a schematic diagram illustrating the structure of a DC-DC converter in accordance with another embodiment of present disclosure.

FIG. 2 is a schematic diagram illustrating the structure of a DC-DC converter in accordance with another embodiment of present disclosure. As shown, the difference between this embodiment and the first embodiment is in that in a DC-DC converter 2 uses a tertiary winding $T_{1a}$ of the main transformer $T_1$ as the coil for recovering and transmitting the leakage inductance energy of the main transformer $T_1$ of the power conversion circuit 10, eliminating the need for the third passive switching element $D_3$ of the auxiliary transformer $T_2$, and further reducing the size of the active clamp circuit 11. Apart from the above, the rest of the structure is substantially identical to that of the DC-DC converter 1 of the first embodiment, and thus omitted herein.

Figure 3A:
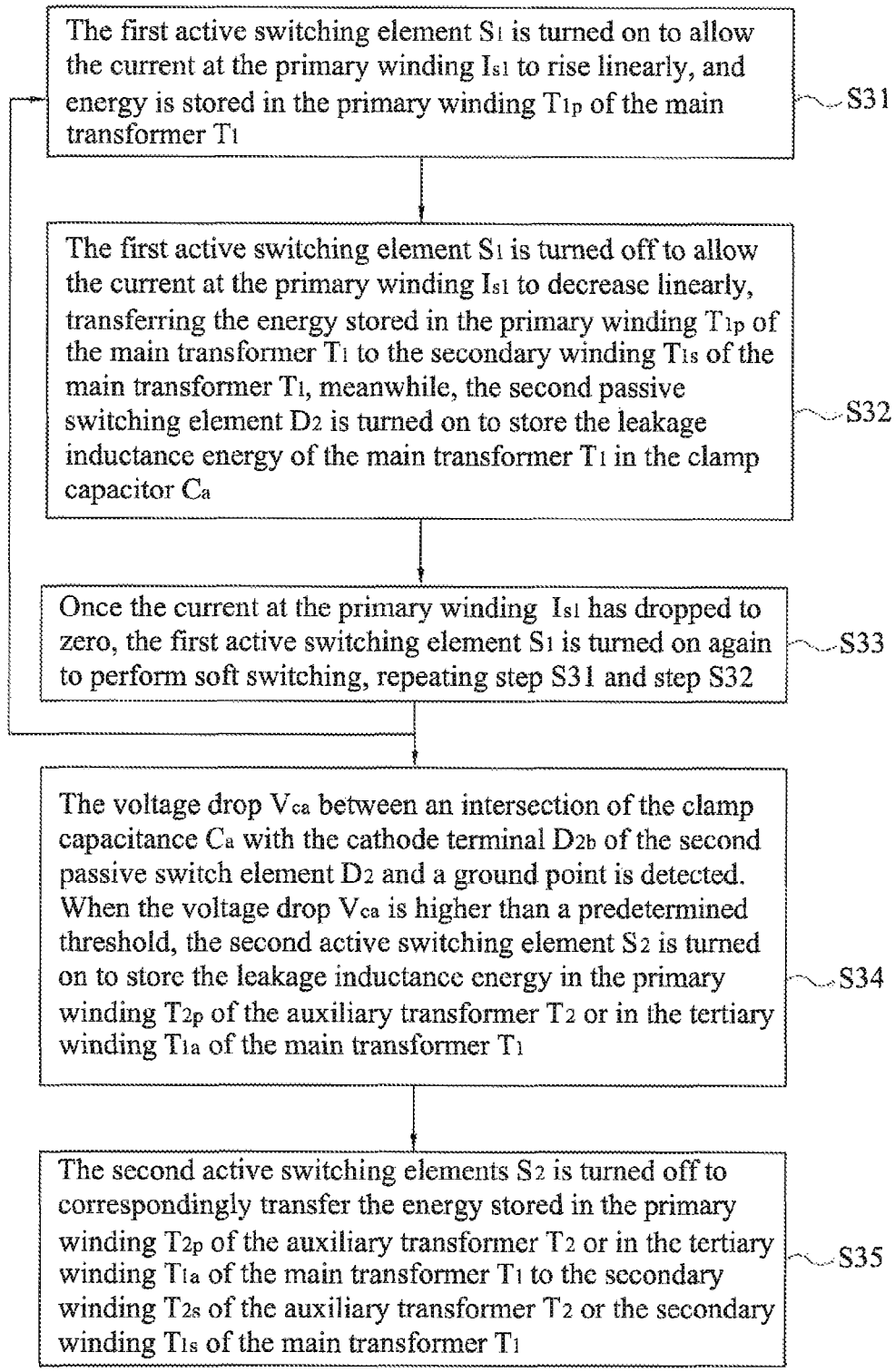
FIG. 3A is a flowchart illustrating a driving method of a DC-DC converter of the present disclosure.
Figure 3B:
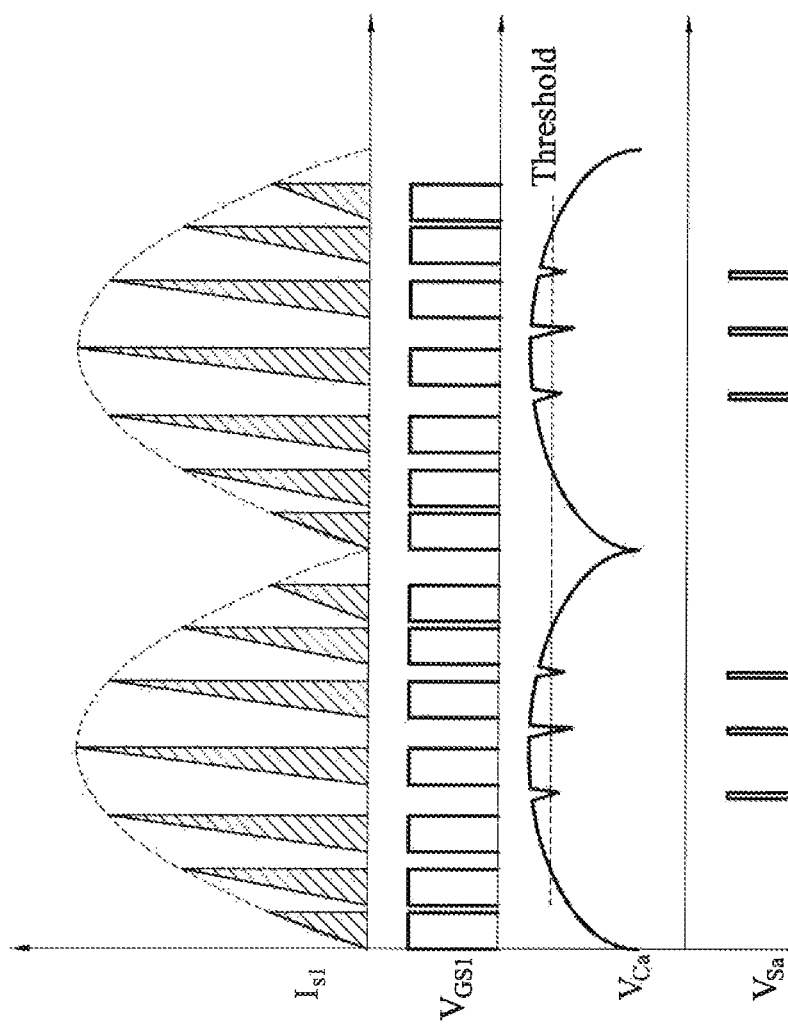
FIG. 3B is a diagram showing waveforms of a DC-DC converter of the present disclosure.

FIG. 3A is a flowchart illustrating a driving method of a DC-DC converter of the present disclosure, and FIG. 3B is a diagram showing waveforms of a DC-DC converter of the present disclosure.

As shown in FIG. 3A, an embodiment of the driving method of a DC-DC converter of the present disclosure includes the following steps S31 to S35.

In step S31, the first active switching element S1 is turned on to allow the current at the primary winding $I_{s1}$ to rise linearly, and energy is stored in the primary winding $T_{1p}$ of the main transformer $T_1$.

In step S32, the first active switching element S1 is turned off to allow the current at the primary winding $I_{s1}$ to decrease linearly, transferring the energy stored in the primary winding $T_{1p}$ of the main transformer $T_1$ to the secondary winding $T_{1s}$ of the main transformer $T_1$, meanwhile, the second passive switching element D2 is turned on to store the leakage inductance energy of the main transformer $T_1$ in the clamp capacitor $C_a$.

In step S33, once the current at the primary winding $I_{s1}$ has dropped to zero, the first active switching element $S_1$ is turned on again to perform soft switching, repeating step S31 and step S32.

In step S34, during operation of the power conversion circuit 10, the voltage drop $V_{ca}$ between an intersection of the clamp capacitance $C_a$ with the cathode terminal $D_{2b}$ of the second passive switch element $D_2$ and a ground point is detected. When the voltage drop $V_{ca}$ is higher than a predetermined threshold, the second active switching element $S_2$ is turned on to store the leakage inductance energy in the primary winding $T_{2p}$ of the auxiliary transformer $T_2$ (the leakage inductance energy is stored in the tertiary winding $T_{1a}$ of the main transformer $T_1$, if there is no auxiliary transformer $T_2$).

In step S35, the second active switching elements $S_2$ is turned off to correspondingly transfer the energy stored in the primary winding $T_{2p}$ of the auxiliary transformer $T_2$ (or the energy stored in the tertiary winding $T_{1a}$ of the main transformer $T_1$, in the absence of an auxiliary transformer $T_2$) to the secondary winding $T_{2s}$ of the auxiliary transformer $T_2$ (or the secondary winding $T_{1s}$ of the main transformer $T_1$).

In one embodiment, steps S34 and S35 are performed to detect, during the operation of the power conversion circuit 10, the voltage drop $V_{ca}$ between an intersection of the clamp capacitance $C_a$ with the cathode terminal $D_{2b}$ of the second passive switch element $D_2$ and a ground point. When this voltage drop $V_{ca}$ is higher than a predetermined threshold, PWM switching of the second active switching element $S_2$ is performed in order to recover the energy of the clamp capacitor via the auxiliary transformer $T_2$ (or via the tertiary winding $T_{1a}$ of the main transformer $T_1$, in the absence of an auxiliary transformer $T_2$), and to correspondingly transfer the energy of the clamp capacitor to the secondary winding $T_{2s}$ of the auxiliary transformer $T_2$ (or the secondary winding $T_{1s}$ of the main transformer $T_1$, in the absence of the secondary winding $T_{2s}$ of the auxiliary transformer $T_2$). The threshold voltage is detected by obtaining a lower voltage potential through a resistor divider and determination of whether the voltage drop has reached the threshold voltage can be made through a comparator.

In an embodiment, the first active switch element $S_1$ and the second active switching element $S_2$ are turned on or off by a pulse frequency modulation signal $V_{GS1}$ and a pulse width modulation signal $V_{sa}$ of the control element (not shown).

In an embodiment, the threshold is set, according to the rated withstand margin of the first active switch, and the period from on to off for the second active switching element $S_2$ is a predetermined fixed time, but the present disclosure is not limited thereto. For example, the voltage drop $V_{ca}$ between an intersection of the clamp capacitance $C_a$ with the cathode terminal $D_{2b}$ of the second passive switch element $D_2$ and a ground point can be detected continuously. When this voltage drop $V_{ca}$ is equal to or higher than a hysteresis upper limit, the second active switching element $S_2$ is turned on. When the clamp capacitor Ca is fully discharged such that the voltage drop is equal to or less than a hysteresis lower limit, the second active switching element $S_2$ is turned off.

In addition, under different input voltage conditions, in the above driving method of a DC-DC converter, the waveform of the current at the primary winding the pulse frequency modulation signal $V_{GS1}$, the pulse width modulation signal $V_{Sa}$ and the voltage difference $V_{Ca}$ are shown in FIG. 3B, for example.

In summary, the DC-DC converter of the present disclosure and the driving method thereof use the clamp capacitor to first recover the leakage inductance energy of the main transformer until the predetermined threshold is reached, and then the energy is directly transferred to the secondary winding of the transformer in one period of oscillation to avoid extras loss caused by the recovered energy being stored in the primary winding oscillation of the transformer and then transferred to the secondary winding. The switching loss of the second active switching element in the active clamp circuit is also reduced, thereby providing a DC-DC converter with high conversion efficiency.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A DC-DC converter, comprising:
   a power conversion circuit, including:
   a main transformer having a primary winding and a secondary winding; and
   a first active switching element having a first source terminal and a first drain terminal electrically connected to the primary winding of the main transformer;
   an active clamp circuit for soft switching the first active switching element and recovering leakage inductance energy of the main transformer of the power conversion circuit, the active clamp circuit including:
   a second passive switching element having a cathode terminal and an anode terminal electrically connected to the first drain terminal of the first active switching element and the primary winding of the main transformer;
   an auxiliary transformer having a secondary winding and a primary winding electrically connected to the cathode terminal of the second passive switching element;
   a third passive switching element connected in series with the secondary winding of the auxiliary transformer;
   a clamp capacitor having one terminal electrically connected to the primary winding of the auxiliary transformer and the cathode terminal of the second passive switching element, and the other terminal electrically connected to the primary winding of the main transformer; and a second active switching element having a second source terminal electrically connected to the primary winding of the main transformer, and a second drain terminal electrically connected to the primary winding of the auxiliary transformer; and a low-frequency DC-AC circuit electrically connected to the secondary winding of the main transformer for converting an output voltage of the power conversion circuit into an AC output voltage in synchronization with the mains.

2. The DC-DC converter of claim 1, wherein the low-frequency DC-AC circuit is a bridge circuit consisting of four active switching elements.

3. The DC-DC converter of claim 1, wherein the first and second active switching elements are power metal-oxide-semiconductor field-effect transistors (MOSFET).

4. A DC-DC converter, comprising:
a power conversion circuit for converting a DC input voltage to a DC output voltage, including:
a main transformer with a primary winding, a secondary winding and a tertiary winding; and
a first active switching element with a first source terminal and a first drain terminal, wherein the first drain terminal is electrically connected to the primary winding of the main transformer;
an active clamp circuit for soft switching the first active switching element and recovering leakage inductance energy of the main transformer of the power conversion circuit, the active clamp circuit including:
a second passive switching element with an anode terminal and a cathode terminal, wherein the anode terminal is electrically connected to the first drain terminal of the first active switching element and the primary winding of the main transformer;
a clamp capacitor with one terminal electrically connected to the tertiary winding of the main transformer and the cathode terminal of the second passive switching element and another terminal electrically connected to the primary winding of the main transformer; and
a second active, switching element with a second source terminal and a second drain terminal, wherein the second drain terminal is electrically connected to the primary winding of the main transformer and the second drain terminal is electrically connected to the tertiary winding of the main transformer; and
a low-frequency DC-AC circuit electrically connected with the secondary winding of the main transformer for converting an output voltage of the power conversion circuit into an AC output voltage in synchronization with the mains.

5. The DC-DC converter of claim 4, wherein the low-frequency DC-AC circuit is a bridge circuit consisting of four active switching elements.

6. The DC-DC converter of claim 4, wherein the first and second active switching elements are power MOSFETs.

* * * * *